United States Patent [19]

Kheraluwala et al.

[11] Patent Number: 5,283,727
[45] Date of Patent: Feb. 1, 1994

[54] INDEPENDENT CONTROL OF THE AC LINE CURRENT AND OUTPUT DC VOLTAGE OF A HIGH POWER FACTOR AC-TO-DC CONVERTER

[75] Inventors: Mustansir H. Kheraluwala, Schenectady; Robert L. Steigerwald, Burnt Hills, both of N.Y.

[73] Assignee: General Electric Company, Schenectady, N.Y.

[21] Appl. No.: 945,791

[22] Filed: Sep. 16, 1992

[51] Int. Cl.$^5$ .............................................. H02M 3/335
[52] U.S. Cl. ........................................ 363/98; 363/37; 363/132
[58] Field of Search ................... 363/17, 37, 98, 132; 323/259, 344, 212, 217

[56] References Cited

U.S. PATENT DOCUMENTS

| | | | |
|---|---|---|---|
| 4,521,840 | 6/1985 | Hoadley | 363/37 |
| 4,555,750 | 11/1985 | Matsumura et al. | 363/37 |
| 4,642,745 | 2/1987 | Steigerwald et al. | 363/37 |
| 4,794,506 | 12/1988 | Hino et al. | 363/17 |
| 4,934,822 | 6/1990 | Higaki | 363/37 |
| 4,967,333 | 10/1990 | Callier et al. | 363/17 |
| 5,113,337 | 5/1992 | Steigerwald | 363/98 |
| 5,115,386 | 5/1992 | Shirahama et al. | 363/98 |
| 5,124,518 | 6/1992 | Lee | 363/98 |
| 5,136,494 | 8/1992 | Akagi et al. | 363/37 |
| 5,157,592 | 10/1992 | Walters | 363/17 |

FOREIGN PATENT DOCUMENTS 2043370 10/1980 United Kingdom ............... 363/132

OTHER PUBLICATIONS

Unitrode Integrated Circuits, Phase Shift Resonant Controller, UC 1875, UC2875, UC3875, Apr. 1992.
Micro Linear Phase Modulation/Soft Switching Controller, ML4818, Jul. 1991.

Primary Examiner—R. Skudy
Assistant Examiner—Thomas M. Dougherty
Attorney, Agent, or Firm—Jill M. Breedlove; Marvin Snyder

[57] ABSTRACT

A method and system for controlling a dual output power converter of the type having a pair of input terminals connectable to a source of rectified AC power of variable voltage amplitude, a boosting circuit including a secondary winding of a boost transformer operatively coupled in circuit with the pair of input terminals for providing a boosted voltage onto a DC power bus, and a full-bridge inverter including at least one controllable switching device serially connected in each leg of the inverter. The inverter has an input connected to the DC bus and a pair of output terminals connected to respective ends of a primary winding of an output transformer, at least one of the pair of output terminals being connected in circuit with the primary winding of the boost transformer. The control system compares signals representative of the magnitude of the AC power voltage to signals representative of the DC bus voltage and varies the inverter frequency of operation in a manner to adjust the magnitude of the DC bus voltage to establish a preselected ratio of DC bus voltage to AC power voltage.

9 Claims, 2 Drawing Sheets

INDEPENDENT CONTROL OF THE AC LINE CURRENT AND OUTPUT DC VOLTAGE OF A HIGH POWER FACTOR AC-TO-DC CONVERTER

FIELD OF THE INVENTION

The present invention relates generally to power converters and, more particularly, to a method and control system for operating power converters of the type having independently controlled dual outputs in which one output boosts another output.

BACKGROUND OF THE INVENTION

Conventional rectifiers have relatively low power factors which limit the power that can be drawn from an AC line to a fraction of the rating of the line. Furthermore, highly distorted AC line currents are drawn by these conventional rectifiers, often causing interference with other electrical equipment in addition to equipment overcurrents and overvoltages. Techniques for improving power factor include passive waveform shaping methods, i.e., using input filters, and active methods, i.e., using boost or buck converter topologies. Such conventional active methods of obtaining high power factor generally employ a completely separate up-front converter to attain the high power factor followed by a DC-to-DC converter to produce the desired regulated DC output voltage. Thus, the power is converted twice, which is costly and inefficient. Moreover, the up-front converter must convert the entire delivered power. In fact, it must convert a peak power equal to twice the average power delivered.

A power conversion system employing a single power stage while operating at high power factor is described in commonly assigned U.S. Pat. No. 4,642,745 issued on Feb. 10, 1987 to R. L. Steigerwald and W. P. Kornrumpf. The power conversion system of the Steigerwald and Kornrumpf patent includes: a full-wave AC rectifier; a DC-to-AC converter; a transformer having a primary winding, a closely-coupled secondary output winding and a loosely-coupled secondary boost winding and a resonant capacitor coupled to the secondary boost winding. The secondary output winding is controlled by pulse width modulation (PWM), and the secondary boost winding is controlled by frequency modulation, thus allowing relatively independent control of the input current and output voltage.

Another form of dual output power converter is disclosed in U.S. Pat. No. 5,113,337 to Steigerwald which completely decouples the boosting converter and the power output stage. In this latter patent, the converter has a high power factor drawing high quality current waveforms from the AC source while providing a regulated DC output with fast transient response. One form of control for the power converters of the above cited patents is disclosed in each of the patents. In general, the patents describe a PWM control for controlling the regulated DC output voltage by adjusting the duty cycle of the inverter output signal whenever an error is detected between the commanded DC output voltage Vo* and the actual DC output voltage Vo. In addition, the Steigerwald and Kornrumpf patent describes an active frequency control wherein the actual converter input current is compared with a commanded current in phase with the utility line voltage. Any difference causes a frequency adjustment for controlling a boosting converter. Advantageously, since the boosting converter and the power supply output voltage are completely decoupled, any adjustment of the DC output voltage using the Steigerwald and Kornrumpf control system will have no effect on the input current to the converter.

Although the above described control scheme effectively controls a dual output converter to provide output voltage regulation at high power factor, it is desirable to provide a more simple control system which decouples the ac line current and the output dc voltage, while maintaining, or improving, output regulation and power factor.

SUMMARY OF THE INVENTION

A dual output, self-boosting power converter regulates DC bus voltage as a preselected ratio of AC input voltage and regulates output voltage by phase shift control of an output switching stage of an inverter in the converter. In one form, the control system minimizes switch stresses in the inverter by establishing the preselected DC bus voltage at an optimized 20% above the peak of the AC input voltage. A proportional plus integral (PI) controller maintains a loop bandwidth substantially below AC line frequency for regulating the DC bus voltage. The PI controller establishes the bus voltage by adjusting the switching frequency of the inverter which is coupled in driving relationship to a resonant stage forming at least part of the boost voltage stage of the converter. Another control loop generates appropriate phase shift commands for at least some of the switching devices in the inverter for regulating the output voltage of the converter.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
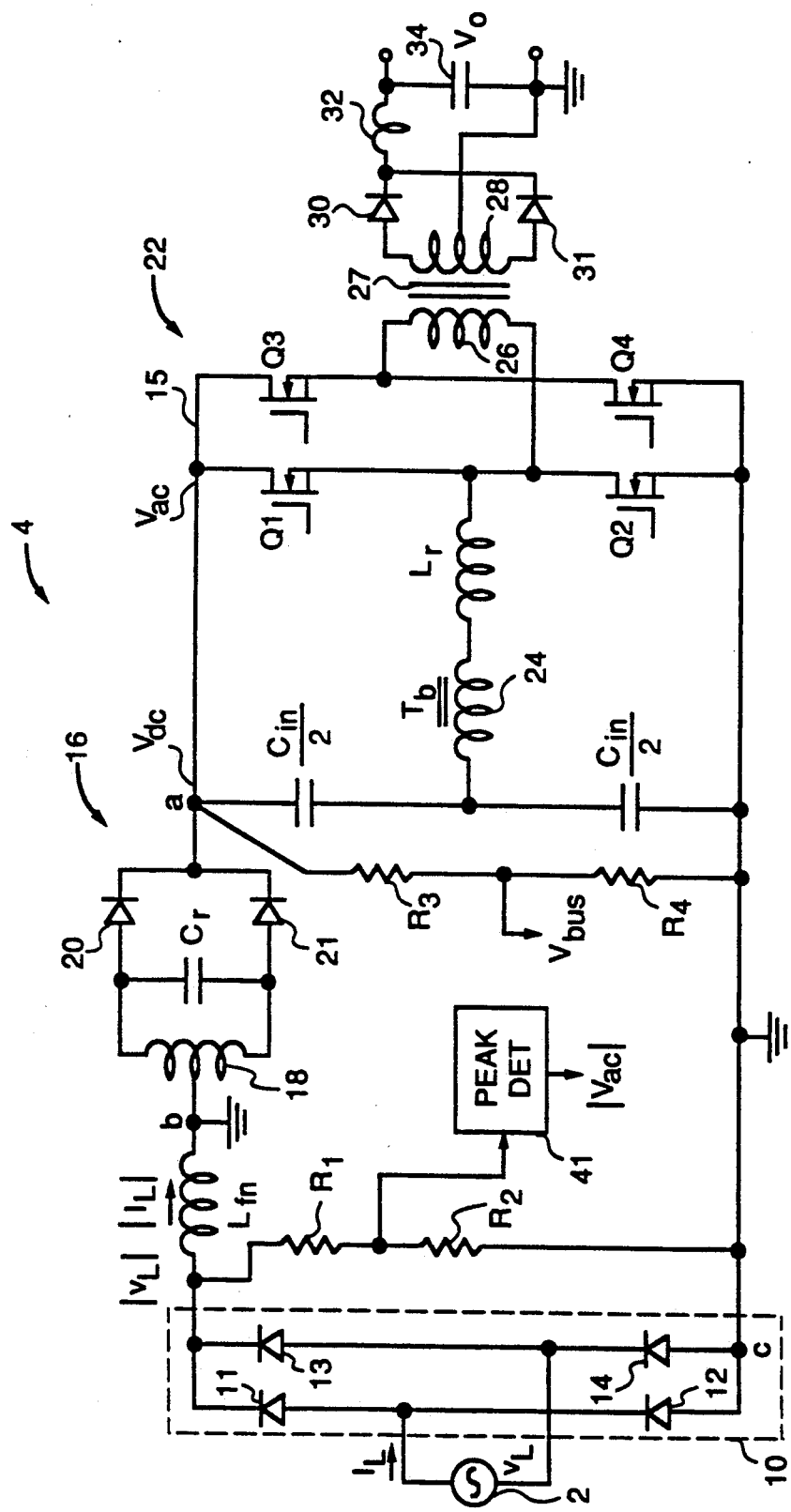
FIG. 1 is a simplified schematic representation of one form of dual output power converter.

FIG. 1 illustrates one embodiment of an off-line switching power supply 4 for converting an AC power line voltage to a regulated DC output voltage. The power supply includes full-wave-rectifier 10, having diodes 11–14 connected together in a full-bridge configuration, coupled to AC power source 2. Rectifier 10 provides a full-wave rectified voltage between points b and c. A boosting converter output circuit 16 is coupled in series with the full-bridge rectifier via a high-frequency filter inductor Lfn. The boosting converter output circuit 16 includes a center-tapped boost transformer secondary winding 18 of a boost transformer Tb coupled in parallel with a resonant capacitor Cr. The boosting converter output circuit further includes a center-tapped transformer, full-wave boost rectifier comprising diodes 20 and 21, the anodes of which diodes are connected to the respective terminals of the resonant capacitor Cr. The cathodes of diodes 20 and 21 are connected together at a point a on a direct current (DC) bus 15.

A DC-to-AC converter 22 comprising a full-bridge connection of switching devices Q1–Q4 is connected between DC bus 15 and a reference voltage which may be at a ground potential. The series combination of boost transformer primary winding 24 and resonant inductor Lr is coupled between the junction joining switching devices Q1 and Q2 of converter 22 and the junction joining a center-tapped pair of energy-storage capacitors Cin/2.

The primary winding 26 of another transformer 27 is coupled across the junctions joining the switching devices Q1-Q2 and Q3-Q4 of the respective full-bridge converter legs. The respective terminals of the secondary winding 28 of transformer 27 are connected to the anodes of diodes 30 and 31. The cathodes of diodes 30 and 31 are connected to an output filter inductor 32 and an output filter capacitor 34. The regulated DC output voltage Vo is provided across capacitor 34.

In operation, the boosting converter provides the instantaneous voltage difference between the rectified output voltage $|VL|$ of the full-bridge rectifier 10 and the DC bus voltage Vdc at bus 15. The output voltage of the resonant boosting converter is controlled by the switching frequency of full-bridge converter switching devices Q1-Q4 via a first AC signal generated across the boosting converter resonant circuit Lr and Cr, while the DC output voltage Vo is controlled by phase shift modulation of a second AC signal generated across transformer 27, i.e. by phase-shifting the two legs of the converter bridge with respect to each other. Because phase-shifting the two full-bridge converter legs does not affect the voltage applied to the resonant circuit Lr and Cr, the boosting converter voltage is independent of the power supply output voltage Vo. As a result, a fast transient response is attained for the input boosting converter and the power supply output voltage simultaneously.

Even with no active control of the AC line current, the power supply of FIG. 1 operates with a relatively high power factor and low peak AC line current, due to the favorable gain characteristics of the parallel resonant circuit Lr and Cr. Near the valleys of the input AC current waveform, low power is delivered, and the resonant circuit is lightly loaded so that the boosting circuit output voltage can ring up to provide the high boost needed, i.e., the difference between the low value of the instantaneous AC line voltage $|VL|$ and the DC bus voltage Vdc. Conversely, near the peaks of the input AC current waveform, higher power is delivered and the resonant circuit is highly damped. As a result, little boosting action is needed. Hence, the gain characteristics of the parallel resonant boosting converter naturally cause the power supply to yield a high power factor. Advantageously, therefore, the power supply does not require active control of the input AC current waveform in order to provide a high power factor.

The boosting power converter is not required to convert the entire power delivered to the load. That is, for a DC bus voltage Vdc which is not substantially greater than the peak of the AC input voltage, i.e., less than twice the peak of the AC input voltage, the peak rating of the boosting power converter is less than the peak power delivered to the DC bus, as a result of the series connection of the boosting converter in the switching power supply. For example, for a dc bus voltage Vdc of approximately 25% above the peak of the AC line voltage, the peak power converted by the boosting converter is approximately 78% of the full power delivered, and the average power processed by the boosting converter is approximately 59% of the full power delivered.

Figure 2:
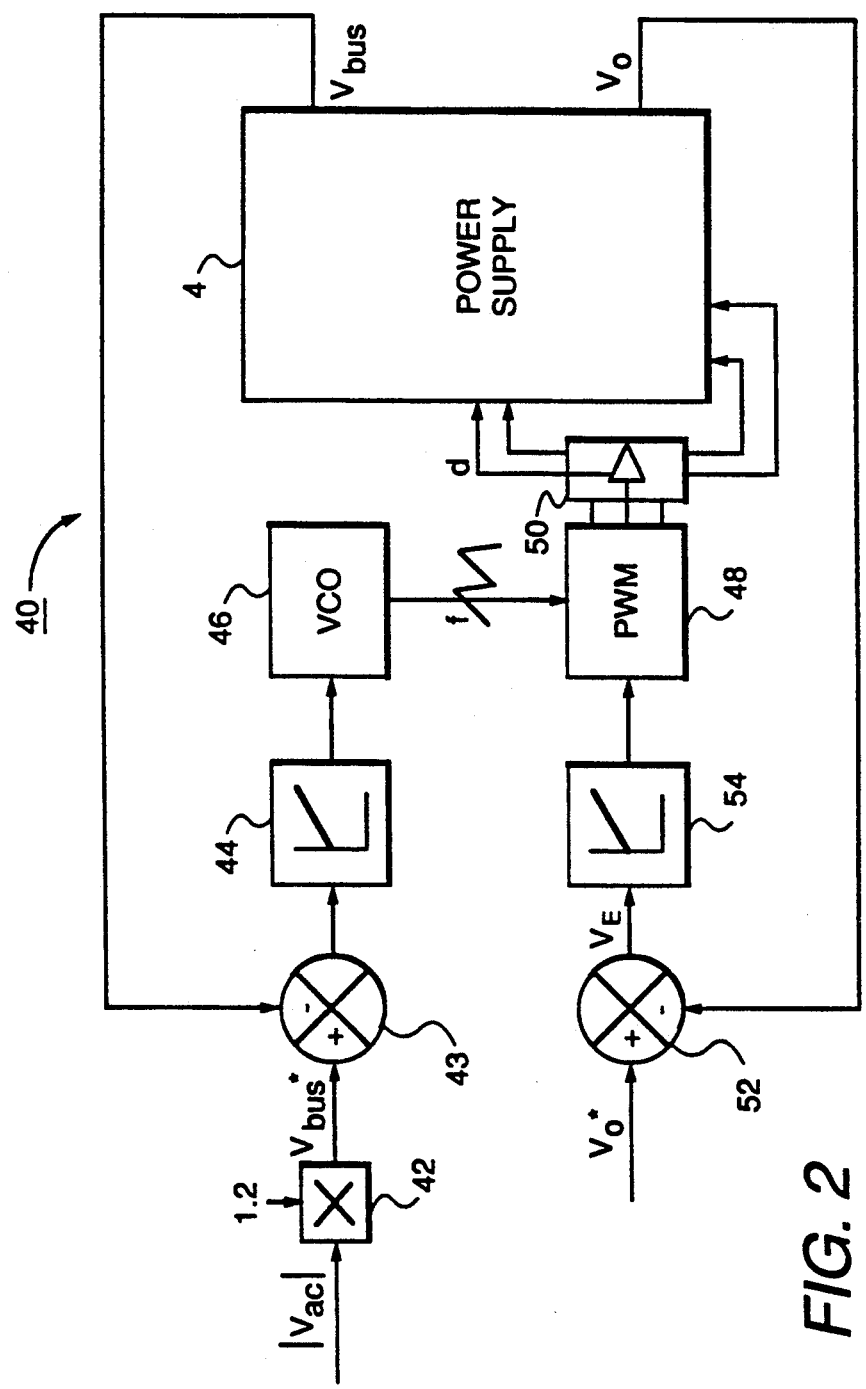
FIG. 2 is a functional block diagram of a control system for the converter of FIG. 1 constructed in accordance with the present invention.

FIG. 2 illustrates a simplified functional block diagram of a control system 40 in accordance with the present invention for controlling the output voltage Vo of the converter of FIG. 1. Control system 40 receives a signal $|Vac|$ proportional to the peak amplitude of the AC input voltage VL applied to the converter of FIG. 1. The signal $|Vac|$ may be derived from a simple resistive voltage divider comprising resistors R1 and R2 serially coupled across the rectified AC input voltage lines and a peak detector circuit 41 of a type well known in the art, as shown in FIG. 1. A second input signal to control system 40 of FIG. 2 is a commanded voltage output signal Vo* (a signal proportional to the desired output voltage Vo). Using input signals $|Vac|$ and Vo*, control system 40 regulates the AC line current iL indirectly by controlling the DC bus voltage Vdc. For high power factor operation, it is important to maintain the bus voltage Vdc above the peak of the input line voltage VL. Moreover, in order to minimize stress on the switching devices Q1-Q4, it is desirable to optimize Vdc at about 20% above VL, although other percentages such as the aforementioned 25% may also be used. Ideally, the bus voltage Vdc would be just minimally above Vac peak, but some tolerance is desirable to compensate for variation in the circuit devices. Hence, as shown in FIG. 2, the reference voltage $|Vac|$ is first multiplied by a factor of 1.2 in multiplier circuit 42; and the resultant higher reference voltage, designated as Vbus* (commanded Vdc), is coupled to a summer 43 where it is summed with a signal Vbus representative of Vdc. The signal Vbus may be derived from a voltage divider comprising resistors R3 and R4 serially coupled between the Vdc bus 15 and ground (FIG. 1). The resulting error signal from summer 43 (FIG. 2), representative of the difference between Vdc and Vbus*, is applied to a conventional proportional plus integral (PI) controller 44. The controller 44 is selected so that a loop bandwidth below the AC line frequency results.

The signal developed by PI controller 44 is coupled to a voltage controlled oscillator 46 (VCO) which is designed to convert the PI controller output signal to a corresponding switching frequency signal for setting the switching frequency of the devices Q1-Q4 at a value sufficient to maintain the DC bus voltage Vdc at the desired value Vbus*. The output signal from VCO 46 is coupled to a pulse width modulation (PWM) block 48 which develops the switching signals to be applied to devices Q1-Q4. The switching signals may be coupled to a switch drive circuit 50 which provides sufficient power for controlling switches Q1-Q4.

While controller 44 and VCO 46 are operative to set the switching frequency of the devices Q1-Q4, control of the output voltage Vo depends on regulating the phase shift between the switching signals applied to devices Q1-Q2 and the switching signals applied to devices Q3-Q4. In general, devices Q1 and Q2 are alternately energized with about a 50% duty cycle so that their switching frequency alone controls the amount of boost voltage and thereby sets the magnitude of Vdc. The conduction time of Q3-Q4 is also on about a 50% duty cycle, but the conduction time is phase shifted with respect to the conduction time of Q1-Q2 for controlling Vo, with maximum output voltage occurring when Q1 and Q4 conduct concurrently, i.e., are in phase, and Q2 and Q3 are in phase. Phase control is achieved by summing command voltage signal Vo* with output proportional signal Vo in summer 52 to develop an error signal VE. The error signal VE is applied to a conventional PI controller 54, the output of which is applied to PWM block 48. PI controllers 44 and 54 are of types well known in the art. VCO 46 and PWM block 48 are available as a single integrated circuit from Unitrode Corp. as a phase shift resonant controller model UC1875 and from Micro Linear Corp. as a phase modulation/soft switching controller model ML4818. Both devices have output driver stages for a full-bridge inverter such as that comprising devices Q1-Q4.

What has been described is a control system for a dual output, high power factor converter or power supply which simplifies the control of such supply by regulating line current indirectly by controlling DC bus voltage. While the invention is described in what is considered to be a preferred embodiment, various modifications will become apparent to those skilled in the art. Accordingly, it is intended that the invention not be limited to the specific illustrative embodiment but be interpreted within the full spirit and scope of the appended claims.

What is claimed is:

1. A control system for a dual output power converter, the converter having a pair of input terminals connectable to a source of rectified alternating current (AC) power of variable voltage amplitude, the converter further comprising a boosting circuit including a secondary winding of a boost transformer coupled in series between the source of rectified AC power and a direct current (DC) power bus, the boosting circuit further including resonant circuit means comprising a combination of said boost transformer, a resonant inductance and a resonant capacitance, the converter further comprising a full-bridge inverter including at least one controllable switching device in each leg thereof, the inverter having an input connected to the DC bus and a pair of output terminals connected to respective ends of a primary winding of an output transformer, at least one of the pair of output terminals being connected in circuit with a primary winding of the boost transformer, the control system comprising comparison means coupled via separate respective signal detectors to the source of rectified AC power and to the direct current power bus, said comparison means comparing the signals representative of the magnitude of the AC power voltage to the signals representative of the DC bus voltage and providing an error signal corresponding to the difference therebetween to a frequency control means, said frequency control means varying the inverter frequency of operation in a manner to adjust the magnitude of the DC bus voltage according to a preselected ratio of DC bus voltage to AC power voltage.

2. The control system of claim 1 wherein said preselected ratio is about 1.2.

3. The control system of claim 1 wherein the inverter has a first pair of switching devices serially coupled between said DC bus and a reference voltage, one terminal of said primary winding of the boost transformer being connected to a junction intermediate said first pair of switching devices, a second terminal of said primary winding of said boost transformer being coupled to said resonant circuit means, said control system being connected for alternately gating each switching device of said pair into and out of conduction at the varying inverter frequency.

4. The control system of claim 3 wherein the inverter includes a second pair of switching devices serially coupled between said DC bus and said reference voltage, a first terminal of the primary winding of the output transformer being connected to a junction intermediate said second pair of switching devices and a second terminal of the primary winding of the output transformer being connected to said junction intermediate said first pair of switching devices, said control system further comprising phase shift control means for shifting the conduction time of said second pair of switching devices with respect to the conduction time of said first pair of switching devices for controlling the voltage output of the power converter.

5. The control system of claim 4 wherein said frequency control means comprises a voltage controlled oscillator (VCO) responsive to the difference between the magnitude of the DC bus voltage and the magnitude of the AC power voltage for establishing the frequency of operation of the inverter.

6. The control system of claim 5 wherein said phase shift control means comprises a pulse width modulation (PWM) circuit responsive to said VCO for providing switching signals to the inverter at a frequency established by said VCO.

7. The control system of claim 6 wherein said phase shift control means further comprises means responsive to the voltage output of the power converter for establishing the conduction initiation time of the second pair of switching devices with respect to the conduction initiation time of the first pair of switching devices.

8. The control system of claim 7 wherein said voltage output responsive means comprises a summing circuit for obtaining a difference signal representative of a difference between the actual output voltage and a desired output voltage, and a proportional plus integral controller responsive to said difference signal for developing a control signal, said PWM circuit being responsive to said control signal for establishing said conduction initiation time of the second pair of switching devices.

9. A method for controlling a dual output power converter, the converter having a pair of input terminals connectable to a source of rectified alternating circuit (AC) power of variable voltage amplitude, the converter further comprising a boosting circuit including a secondary winding of a boost transformer coupled in series between the source of AC power and a direct current (DC) power bus for providing a boosted voltage thereto, the boosting circuit further including resonant circuit means comprising a combination of said boost transformer, a resonant inductance and a resonant capacitance, the converter further comprising a full-bridge inverter including at least one controllable switch device in each leg thereof, the inverter having an input connected to the DC bus and a pair of output terminals connected to respective ends of a primary winding of an output transformer, at least one of the pair of output terminals being connected in circuit with a primary winding of the boost transformer, the method including the steps of:

detecting signals representative of the magnitude of the AC power voltage and signals representative of the magnitude of the DC bus voltage;

comparing the signals representative of the magnitude of the AC power voltage to the signals representative of the magnitude of the DC bus voltage and providing an error signal proportional to the difference therebetween; and varying the inverter frequency of operation in a manner to adjust the magnitude of the DC bus voltage according to a preselected ratio of boosted voltage to AC power voltage.

* * * * *